A. R. KOEHLER.
WORK HOLDER FOR MACHINES FOR TRIMMING ELECTROTYPE BLOCKS OR THE LIKE.
APPLICATION FILED AUG. 18, 1915.
1,227,156. Patented May 22, 1917.
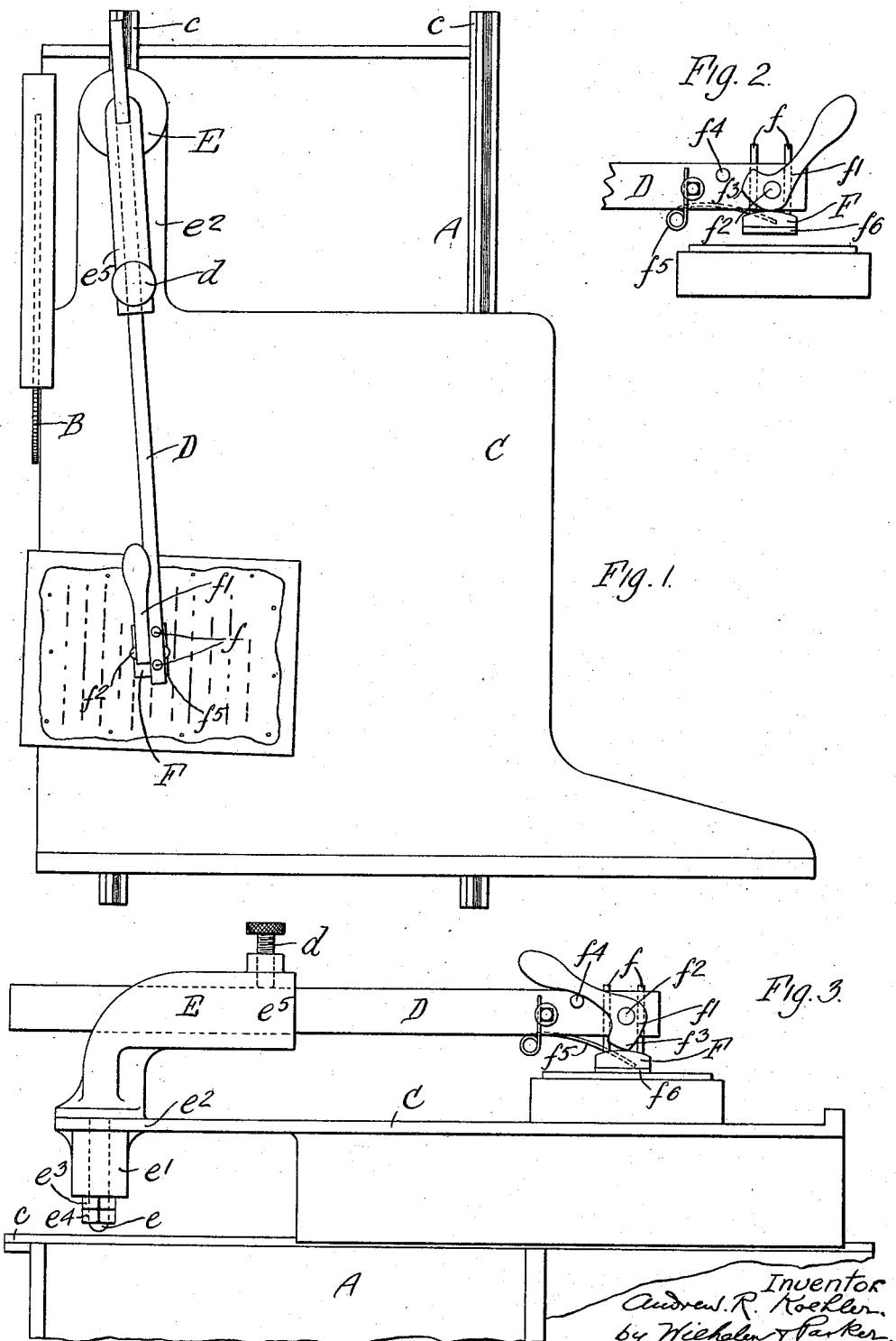

UNITED STATES PATENT OFFICE.

ANDREW R. KOEHLER, OF BUFFALO, NEW YORK.

WORK-HOLDER FOR MACHINES FOR TRIMMING ELECTROTYPE-BLOCKS OR THE LIKE.

1,227,156. Specification of Letters Patent. Patented May 22, 1917.

Original application filed October 28, 1914, Serial No. 869,061. Divided and this application filed August 18, 1915. Serial No. 46,131.

*To all whom it may concern:*

Be it known that I, ANDREW R. KOEHLER, a citizen of the United States, residing at Buffalo, in the county of Erie and State of New York, have invented a new and useful Improvement in Work-Holders for Machines for Trimming Electrotype-Blocks or the like, of which the following is a specification.

This invention relates to machines for trimming or cutting blocks or the like, and more particularly to means for securely holding or clamping the block or work while the cutting member operates thereon.

This application is a division of my pending application 869,061, filed October 28, 1914.

The object of this invention is to provide a clamping device of this kind of improved construction which is so constructed that it can be readily moved to any part of the table of the cutting machine and into operative relation to the work and locked in this position by merely actuating the clamp.

The invention is primarily intended to be used in connection with machines for trimming electrotype blocks, which are all of approximately uniform thickness, but it is not intended to limit the invention to such use.

In the accompanying drawings:

Figure 1 is a top plan view of a cutting machine having a clamping device embodying the invention mounted thereon.

Fig. 2 is a side elevation of the upper part of the machine and of the clamping device.

Fig. 3 is a fragmentary side elevation of the clamping device showing the presser foot which engages the article to be held.

A represents the base or frame of the machine which may be of any suitable or desired construction, and on which a saw or cutter B is suitably mounted. In the construction shown the cutter B is of the revolving type and rotates about a fixed axis, and a table C on which the work is supported is movable into and out of operative relation to the cutter. For this purpose the frame A is provided with tracks or guide rails $c$ extending lengthwise of the machine and on which the movable work-supporting table is adapted to reciprocate. One edge of the feed table moves past the cutter in close proximity thereto and the work or block to be cut is so placed on the table that the part to be cut off projects over the edge of the table. The table in the machine shown is adapted to be pushed toward the back of the machine by the operator for feeding the work to the cutter and may be provided with any suitable means (not shown) for properly squaring or alining the work relatively to the cutter.

Briefly stated, the means for clamping the work on the table include an arm or rod D which is slidable lengthwise on a post or bracket E which is pivoted to swing about an axis arranged substantially perpendicular to the work supporting table and the outer end of the arm or rod is provided with a presser foot or analogous device F adapted to bear against the work to press the same against the work supporting table.

The post or bracket E, in the construction shown, is provided with a downwardly extending pivot pin $e$ which enters a hole in a boss $e'$ formed on a projecting portion $e^2$ of the table. The pin is held in the boss by means of nuts $e^3$ $e^4$. The post or bracket has a lateral extension $e^5$ which is provided with a hole in which the arm or rod D is slidably arranged. This hole and the rod D are preferably made rectangular in cross-section so that the rod is held from turning. By means of this construction the outer end of the arm D can be swung about the axis of the pivot pin $e$ and can also be moved toward and from this axis so that the end of the arm can be placed over any part of the feed table. If desired the arm D may be held against endwise movement in the bracket by means of a set screw $d$, for example when the machine is employed for trimming a number of articles of the same kind or size. Any suitable means may be provided at the outer end of this arm for clamping the work on the table, that shown in the drawings being constructed as follows:

A presser foot F is slidably mounted on the end of the arm D to move up and down relatively to the feed table, being provided with pins $f f$ extending through holes in the arm D for guiding the presser foot in its movement. The presser foot is moved into engagement with the block by any suitable means, such as a cam lever $f'$ pivoted at $f^2$ to the arm D and having a cam face $f^3$ adapted to engage the presser foot to move the same downwardly. A pin $f^4$ limits the movement of the cam lever in the direction to cause the presser foot to engage the block. The cam face is so shaped that the lever will engage the pin just after passing the dead center position, so that the lever will be held in this position. A spring $f^5$ holds the presser foot normally in its upper position. The presser foot is provided with a suitable elastic pad $f^6$ which protects the face of the work against injury and which also compensates for any slight variation in the thickness of the work.

The means described for holding the blocks on the feed table can be easily operated, it being only necessary to move the end of the arm D in any direction over the block and then to move the cam lever to its operative position. The universal movement of the end of the arm D in a plane above and substantially parallel with the plane of the table greatly reduces the time required for clamping the work on the table. The pressing of the presser foot into engagement with the work serves also to bind the arm D in the hole in the post E and to bind to a certain extent the pivot pin $e$ in the boss $e'$, thus insuring the firm holding of the work on the table. The holding means avoid the necessity of the block being held by hand and consequently lessens the chances of injury from the cutter.

I claim as my invention:

1. In a trimming machine, the combination of a work supporting table, a member pivoted on said table to swing in a plane substantially parallel with the table and having a part provided with a hole extending substantially parallel with the table, an arm slidably arranged in said hole, and clamping means on the outer portion of said arm for holding the work on the table while being operated upon, the pressure of said clamping means against the work also clamping said arm in said hole to secure the same against movement relatively to said pivoted member.

2. In a trimming machine, the combination of a work supporting table, a member pivoted on said table to swing in a plane substantially parallel with the table and having an elongated part provided with a longitudinal hole extending substantially parallel with the table, an arm slidably arranged in said hole, a presser foot slidably mounted on the outer portion of said arm and movable toward and from said table, and a cam for moving said presser foot toward the table, the pressure of the presser foot against the work also clamping said arm in said hole to secure the same against movement.

3. In a trimming machine, the combination of a work supporting table, a member pivoted on said table to swing in a plane substantially parallel to said table, an arm slidable with regard to said member, a presser foot arranged on the outer end of said arm and having a sliding connection with said arm to enable the presser foot to move toward and from said table, a spring for yieldingly moving said presser foot away from said table, and a cam engaging said arm and said presser foot for pressing said presser foot toward said table for holding the work thereon.

Witness my hand, this 17th day of August, 1915.

ANDREW R. KOEHLER.

Witnesses:
F. E. PROCHNOW,
ALBERT G. DIMOND.